C. B. KING & J. W. FELLMETH.
FRICTION CLUTCH.
APPLICATION FILED SEPT. 19, 1911.
1,128,006.
Patented Feb. 9, 1915.
2 SHEETS—SHEET 2.
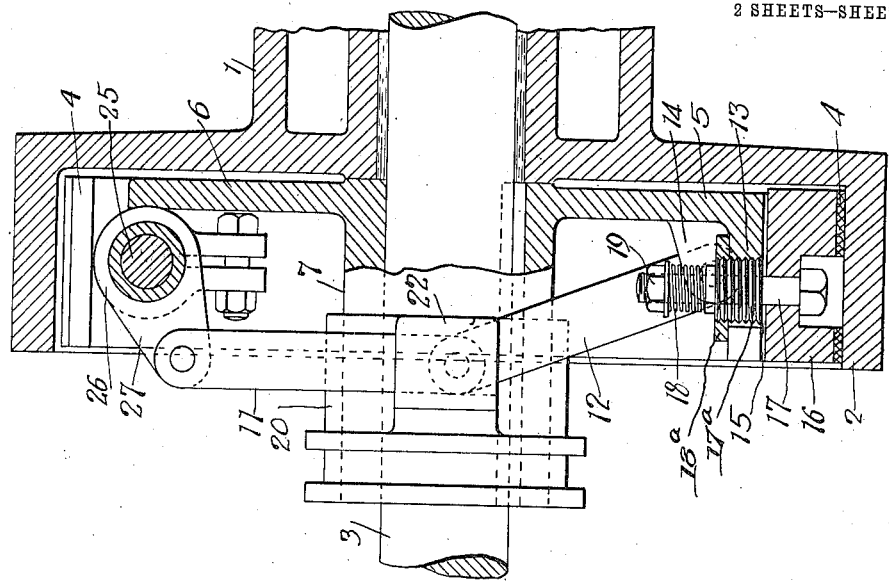
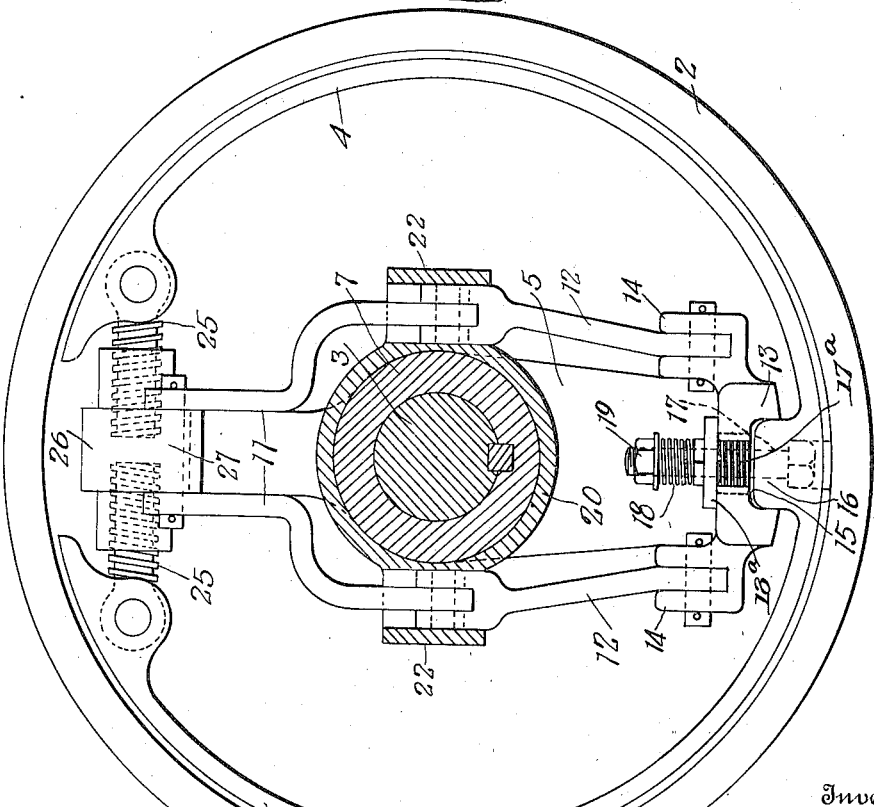
Witnesses
G. Howard Walmsley.
Harrie L. Hammaker.
Inventors
Charles B. King,
Jacob W. Fellmeth,
By Toulmin & Read.
Attorney

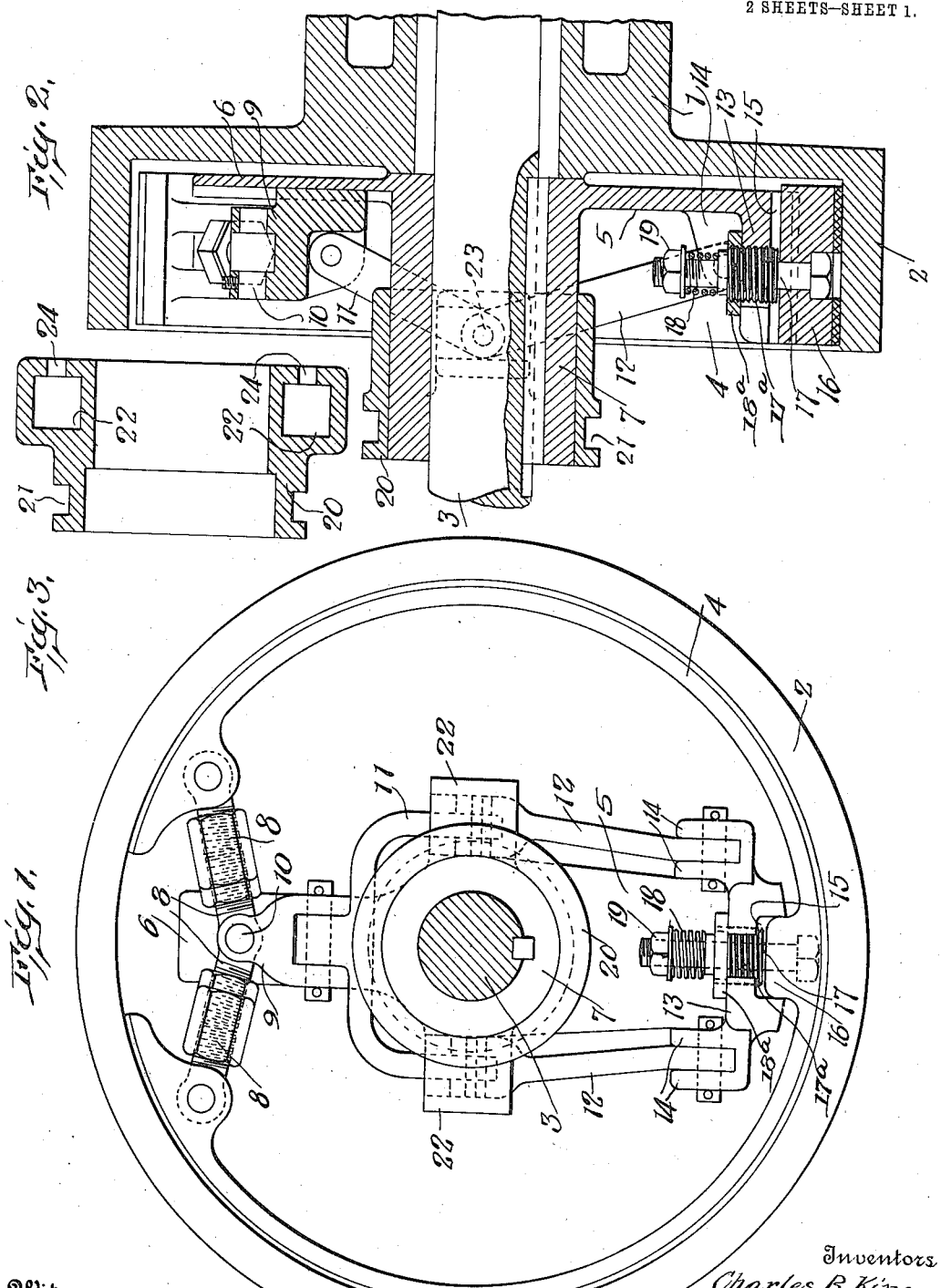

UNITED STATES PATENT OFFICE.

CHARLES B. KING AND JACOB W. FELLMETH, OF MARION, OHIO, ASSIGNORS TO THE MARION STEAM SHOVEL COMPANY, OF MARION, OHIO, A CORPORATION OF OHIO.

FRICTION-CLUTCH.

1,128,006.  Specification of Letters Patent.  Patented Feb. 9, 1915.

Application filed September 19, 1911.  Serial No. 650,242.

*To all whom it may concern:*

Be it known that we, CHARLES B. KING and JACOB W. FELLMETH, citizens of the United States, residing at Marion, in the county of Marion and State of Ohio, have invented certain new and useful Improvements in Friction-Clutches, of which the following is a specification, reference being had therein to the accompanying drawing.

This invention relates to friction clutches and the object of the invention is to provide a very compact clutch mechanism which will require a small amount of movement for its operation, thereby enabling it to be mounted and operated in a small space; and which will be sufficiently powerful for heavy work.

In the accompanying drawings, Figure 1 is an elevation of a clutch mechanism embodying our invention; Fig. 2 is a vertical section, taken centrally through the same; Fig. 3 is a sectional detail view of the sliding collar; Fig. 4 is an elevation of a modified form of the invention; and Fig. 5 is a vertical section, taken centrally of Fig. 3.

In these drawings we have illustrated one embodiment of our invention, with a slight modification thereof, and have shown the same as applied to a power-operated winch which is indicated at 1 and constitutes the driven member of the clutch mechanism. This winch is provided with a web having at its outer edge a laterally extending flange 2 which forms one of the friction devices for the clutch mechanism. The winch or cable drum 1 is loosely mounted on a shaft 3 which is positively actuated from any suitable source of power and constitutes the driving member of the clutch mechanism. The second friction device comprises a band 4 arranged within the flange 2 constituting the first-mentioned friction device and supported by arms 5 and 6 carried by a hub 7 which is rigidly secured to the shaft 3. This friction band 4 is connected at its ends with the arm 6, which connection is preferably made by means of suitable expanding devices adapted to expand the band and cause it to grip the friction surface of the flange 2. As here shown this expanding device comprises a toggle consisting of arms 8 pivotally connected at their outer ends to the respective ends of the band and pivotally connected at their inner ends to a slide block 9 on a common center, which, in the present instance, comprises a pin 10 mounted in the slide block. The slide block may be mounted on the arm 6 in any suitable manner, but is here shown as having a dove-tail portion fitting into a dove-tail slot in the face of the arm 6, thus permitting the block to have a radial movement but holding it against all other movement relative to the arm. The outward movement of the block 9 tends to move the arms 8 of the toggle into alinement and thus expand the friction band. This movement is imparted to the block by means of a second toggle comprising a yoke shaped lever 11 pivotally mounted at its outer end on the block 9 and having the inner ends of its arms connected with other arms or levers 12 which, in turn, are mounted on the arm 5. To support the levers 12 the arm 5 is provided with a foot piece or plate 13 having lugs 14 between which the ends of the levers 12 extend and to which they are pivotally connected. The foot piece 13 of the arm 5 has in its outer surface a recess 15 adapted to receive a projection 16 on the adjacent portion of the friction band 4, thereby holding the arm 5 and the hub 7 against rotatory movement relatively to the band.

In order that the band 4 may be disengaged from the friction member 2 instantaneously at all points of the circumference thereof, a spring-actuated release is provided for that part of the band opposite the ends thereof. As here shown a bolt 17 extends through the band, through the foot piece 13 of the arm 5 and has a spring 18 coiled abuot the same between the housing 17ª and a nut 19 on the end of the bolt. The foot piece 13 being held against radial movement the tendency of the spring 18 will be to lift the friction band away from the other friction member. The tension of the spring is not sufficient to offer material resistance to the operation of the actuating devices but is sufficient to move the band when these devices have been released.

We also prefer to make the expanding toggle 8 adjustable in order that the frictional contact between the band and the flange 2 may be regulated to accommodate the same to different loads and the length of the toggles may be adjusted to compensate for wear. To accomplish this each toggle arm is made of an adjustable length, this being preferably accomplished by forming each arm in two parts connected by a screw-threaded sleeve 8ª on the order of an ordinary turn buckle. We have also provided means for regulating the amount of clearance between the central portion of the band and the friction surface of the flange 2. This we accomplish by adjusting the throw imparted to the bolt 17 by the spring 18. In the present instance, the bolt 17 is extended loosely through a bushing 17ª screw-threaded into the foot 13 of the arm 5 and the spring 18 is confined between the end of the bushing and the nut 19 on the end of the bolt. By adjusting the bushing the spring may be caused to lift the bolt a greater or lesser distance, thus increasing or decreasing the clearance between the band and the flange. A jam nut 18ª serves to lock the bushing 17ª in adjusted positions.

It will be noted that when the bushing is screwed down from the position shown in the drawings it will act on the lug 16 to limit the movement imparted to the friction band by the spring, thus enabling a uniform clearance to be maintained between the friction band and the flange of the drum as the friction lining wears away.

The toggle comprising the levers 11 and 12 may be operated in any suitable manner. As here shown a collar 20 is slidably mounted on the hub 7 and is provided with an annular groove 21 to receive the yoke of an operating lever of any suitable construction. On its opposite sides this collar is provided with housings 22 into which extend the respective ends of the levers 11 and 12. The levers 12 have their inner ends bifurcated to receive the corresponding ends of the levers 11 which are connected thereto by means of pins 23. The housings 22 are slotted in one edge, as indicated at 24, to permit the levers of the toggle to move about their pivotal centers. This housing forms a very strong connection between the toggle and the actuating collar which will permit not only of the pivotal movement of the levers but will also allow such other movement relatively to the collar as may result from the operation of the toggle, it being obvious that the pivot pin of the toggle will have a slight transverse movement during the operation thereof.

The operation of the device will be obvious from the foregoing description and it will be apparent that when the collar 20 is moved inward the toggle levers 11 and 12 will be moved into alinement and that this movement will impart radial movement to the slide block 9, which, in turn, will tend to move the arms 8 of the toggle into alinement, and that in this manner we secure the combined power of the two toggles and at the same time have rendered the device so compact that it can be mounted within the flange of the winch drum. The power secured with the double actuating arrangement is such as to render the use of the clutch practical for very heavy work; and further, the arrangement of the clutch mechanism is such that the drum can be operated with equal facility in either direction.

In the foregoing description and in Figs. 1 to 3 of the drawings we have described and illustrated an embodiment of our invention comprising a double toggle mechanism. It will be obvious, however, that other mechanism could be substituted for the toggles either in part or in whole, and, in Figs. 4 and 5 we have illustrated one modification of our invention in which screws are substituted for the smaller or expanding toggles. The remainder of the mechanism is similar to that shown in Figs. 1 to 3 but instead of connecting the ends of the friction band 4 to a slide block carried by the arm 6 we pivotally connect each end of the band to the outer end of a screw 25 having a quick pitch thread. The inner ends of these screws are mounted in a nut 26 having its ends provided with opposite threads and also having a crank arm 27 which is pivotally connected to the lever 11 of the main toggle. With this construction, when the toggle levers 11 and 12 are moved into alinement the nut 26 will be rotated on the screws and the two screws caused to move in opposite directions, thus forcing the ends of the band outward and into contact with the friction member 2.

We wish it to be understood that while we have shown one form of our invention, with a slight modification thereof, this has been chosen for the purpose of illustration only and we do not desire to be limited to the details of construction shown and described, for obvious modifications will occur to a person skilled in the art.

Having thus fully described our invention, what we claim as new and desire to secure by Letters Patent, is:—

1. The combination, with a driving member and a driven member, one of said members having a friction surface and the other of said members comprising a shaft and an expansible friction device connected to said shaft and arranged to coöperate with said friction surface, of a collar slidably mounted on said shaft, an actuating device for said expansible friction device comprising a toggle consisting of pivoted sections having their pivoted portions connected directly with said collar, said pivoted portions being movable transversely to said shaft.

2. The combination, with a driving member and a driven member, one of said members having a friction surface and the other of said members comprising a shaft and an expansible friction device connected to said shaft and arranged to coöperate with said friction surface, of a collar slidably mounted on said shaft, an actuating device for said expansible friction device comprising a toggle consisting of pivoted sections and having their pivoted portions slidably mounted on said collar to move transversely to the line of movement of said collar.

3. The combination, with a driving member and a driven member, one of said members having a friction surface and the other of said members comprising a shaft and an expansible friction device connected to said shaft and arranged to coöperate with said friction surface, of a collar slidably mounted on said shaft and having a guideway extending transversely to said shaft, and an actuating device for said expansible friction device comprising a toggle consisting of pivoted sections having their pivoted portions mounted in said guideway.

4. The combination, with a driving member and a driven member, one of said members having a friction surface and the other of said members comprising a shaft and an expansible friction device connected to said shaft and arranged to coöperate with said friction surface, of a collar having a housing, and an actuating device for said expansible friction device comprising a toggle consisting of pivoted sections having their pivoted portions loosely mounted in said housing to permit them to move transversely to the line of movement of said collar.

5. The combination, with a driving member and a driven member, one of said members having a friction surface and the other of said members comprising a shaft and an expansible friction device connected to said shaft and arranged to coöperate with said friction surface, of a collar having guideways on the opposite sides thereof, and an actuating device for said expansible friction device consisting of a yoke-shaped lever having one end connected with the expansible friction device and its yoke arms arranged on opposite sides of said collar and other arms pivotally connected to the respective yoke arms to form toggle joints, the pivotal connections between said arms being mounted in said guideways.

6. The combination, with a driving member and a driven member, one of said members having a friction surface and the other of said members comprising a shaft and an expansible friction device connected to said shaft and arranged to coöperate with said friction surface, of a collar slidably mounted on said shaft and having a guideway, an expanding device for said expansible friction device, a toggle comprising pivoted sections having their pivoted portions mounted in said guideway on said collar, one of said sections having its free end connected with said expanding device and the other of said sections having its outer end connected with a part held against movement longitudinally of said shaft.

7. The combination, with a driving member and a driven member, one of said members having a friction surface and the other of said members comprising a shaft and an expansible friction device connected to said shaft and arranged to coöperate with said friction surface, of a collar slidably mounted on said shaft, a hub rigidly secured to said shaft and having portions extending radially on opposite sides of said shaft, an expanding device slidably mounted on one of said arms, a toggle comprising pivoted sections, one of which has its outer end connected with said expanding device and the other of which has its outer end connected with the arm opposite said expanding device, the pivoted portions of said sections being slidably mounted on said collar.

8. The combination, with a driving member and a driven member, one of said members having a friction surface and the other of said members comprising a shaft and an expansible friction device connected to said shaft and arranged to coöperate with said friction surface, of a toggle connected with said expansible friction member and having adjustable arms, a second toggle having one arm pivotally connected with the first-mentioned toggle, and means for actuating said second toggle.

9. The combination, with a shaft, and a part rotatably mounted thereon and having a friction member, of a hub fixed on the shaft, a collar slidable on the hub and formed with opposed housings, an expansible friction band disposed within said friction member, a toggle having pivotal connections with the ends of the band, an arm extending radially from the hub and formed at its outer end with a foot, and a second toggle having pivotal connections at its ends with the first-mentioned toggle and foot, said second-mentioned toggle comprising pivotally connected sections having their pivots loosely arranged in the housings of said collar for actuating the first-mentioned toggle to expand the band against the member to lock said shaft and member together upon movement in one direction of said collar.

10. The combination, with a shaft, and a part rotatably mounted thereon and having a friction member, of a hub fixed on said shaft, a collar slidable on said hub and formed with opposed housings, an expansible friction band disposed within said friction member, an arm extending radially from the hub and arranged between the ends of the band, a block slidable along said arm, links having their inner ends pivotally connected to the block and having their outer ends respectively connected to the ends of the band, a yoke-shaped lever having its outer end pivotally connected to the block and having its inner ends disposed within the housings of the collar, a second arm extending radially from the hub and arranged in alinement with the first mentioned arm, and links each pivoted at its outer end to the second-mentioned arm and having its inner end disposed within one of the housings and pivotally connected to the adjacent end of the yoke-shaped lever.

11. The combination, with a shaft, and a part rotatably mounted thereon and having a friction member, of a hub fixed on said shaft, a collar slidable on said hub and formed with opposed housings, an expansible friction band disposed within said friction member, an arm extending radially from the hub and arranged between the ends of the band, a block slidable along said arm, links having their inner ends pivotally connected to the block and having their outer ends respectively connected to the ends of the band, a yoke-shaped lever having its outer end pivotally connected to the block and having its inner ends disposed within the housings of the collar, a second arm extending radially from the hub and arranged in alinement with the first-mentioned arm, a foot extending outwardly from the second arm and arranged in spaced relation to the band, a bolt carried by the band and extending inwardly through said foot, a coiled spring disposed around the bolt intermediate the foot and stop, and links each pivoted at its outer end to the second-mentioned arm and having its inner end disposed within one of the housings and pivotally connected to the adjacent end of the yoke-shaped lever.

12. The combination, with a shaft, and a member rotatably mounted on said shaft and having an annular friction member, of an arm having a slotted portion, a friction band arranged to engage said friction member, an expanding device for said friction band, a toggle operatively connected with said expanding device, a bolt extending through said band and through the slot in said arm, a nut on said bolt, and a spring interposed between said nut and said arm.

13. The combination, with a driving member and a driven member, one of said members having a friction surface, of a friction band connected with the other of said members and arranged to coöperate with said friction surface, an actuating device to move said friction band into operative engagement with said friction surface, a spring to move said friction band away from said friction surface, and an adjustable stop arranged to limit the movement of said friction band and thus regulate the amount of clearance between the band and the friction surface.

14. The combination, with a driving member and a driven member, one of said members having a friction surface, the other of said members comprising a shaft, and an arm carried by said shaft and rotatable therewith, of a friction band arranged to coöperate with said friction surface, an actuating device for expanding said friction band, means for operating said actuating device, a bushing adjustably mounted on the arm carried by said shaft and arranged to limit the movement of said friction band, a bolt secured to said friction band and extending loosely through said bushing, and a spring acting on said bolt to move said friction band away from said friction surface.

15. The combination, with a driving member and a driven member, one of said members having a friction surface, the other of said members comprising a shaft and a friction band extending about said shaft and arranged to coöperate with said friction surface, of a toggle comprising two sections having their adjacent ends pivotally connected one to the other and their outer ends pivotally connected with the respective ends of said friction band, a second toggle having one end positively connected with the first-mentioned toggle, and an actuating device connected with said second toggle, whereby any movement imparted to said second toggle in either direction will be transmitted to said friction band.

In testimony whereof, we affix our signatures in presence of two witnesses

CHARLES B. KING.
JACOB W. FELLMETH.

Witnesses:
H. H. CONNOLLY,
C. M. WRIGHT.